Figure 1:
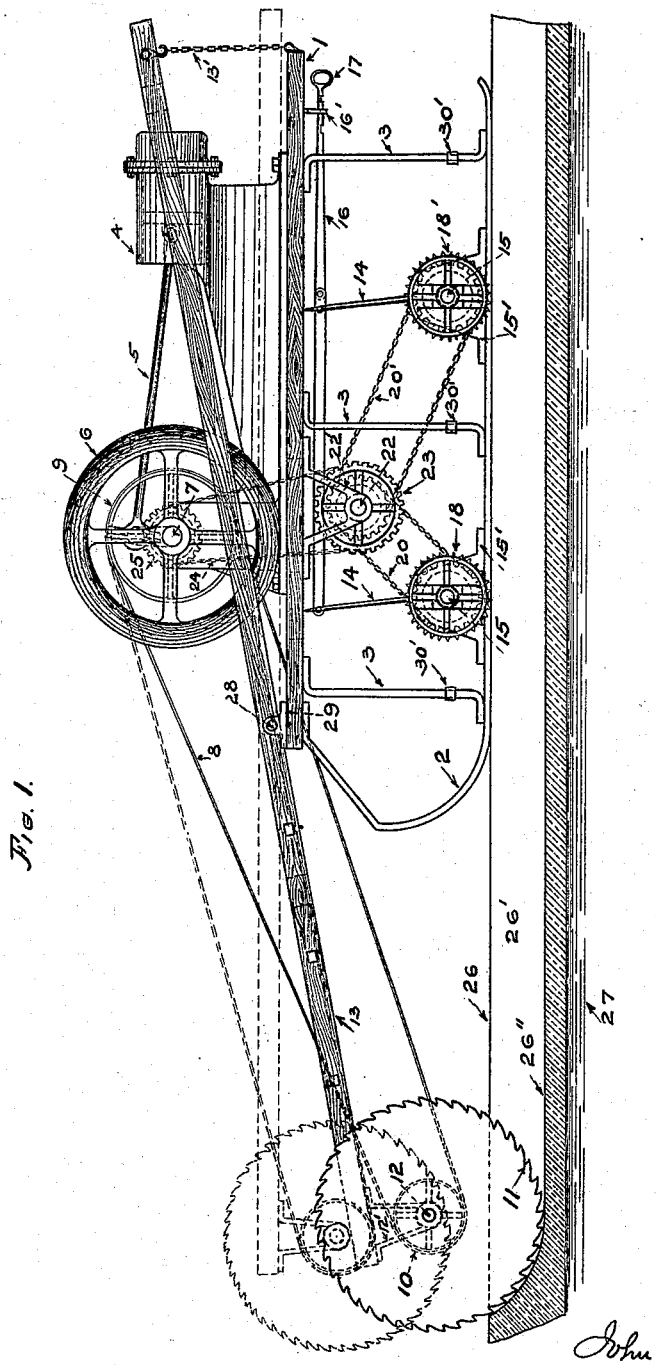
Figure 2:
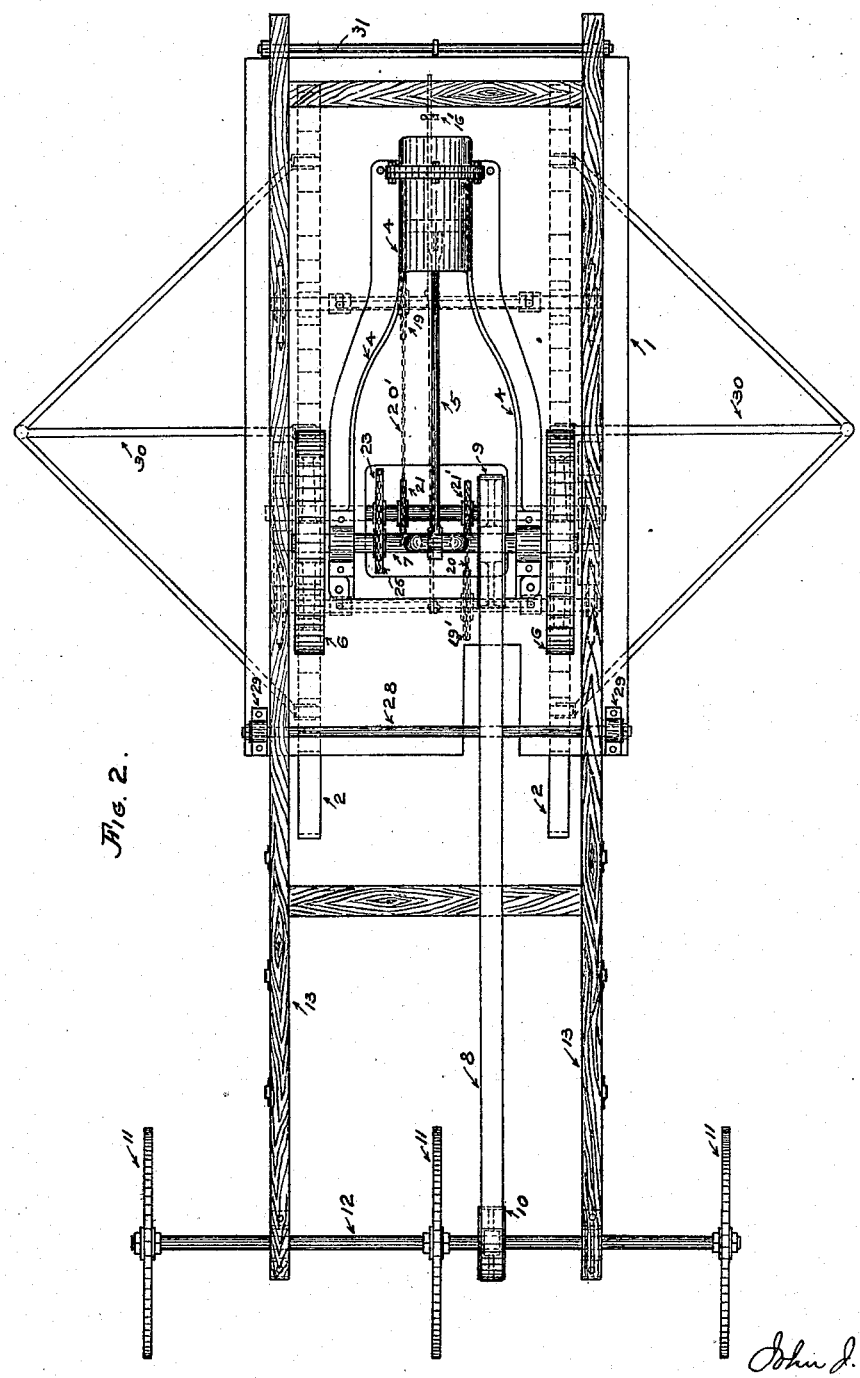
Figure 3:
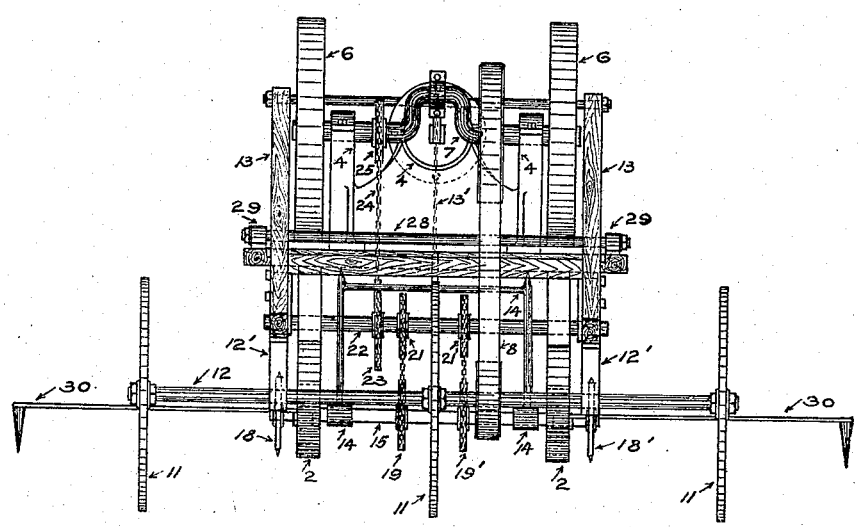

J. J. TOBIN.
ICE CUTTING MACHINE.
APPLICATION FILED APR. 8, 1909.

932,729.

Patented Aug. 31, 1909.
3 SHEETS—SHEET 3.

WITNESSES:
Jennette Peal
S. Gleb-Koshansky

John J. Tobin
INVENTOR.
BY John F. Kerr
ATTORNEY.

UNITED STATES PATENT OFFICE.

JOHN J. TOBIN, OF ONEONTA, NEW YORK.

ICE-CUTTING MACHINE.

932,729. Specification of Letters Patent. Patented Aug. 31, 1909.

Application filed April 8, 1909. Serial No. 488,705.

*To all whom it may concern:*

Be it known that I, JOHN J. TOBIN, a citizen of the United States, residing at Oneonta, in the county of Otsego and State of New York, have invented certain new and useful Improvements in Ice-Cutting Machines, of which the following is a specification, reference being had therein to the accompanying drawing.

My invention relates to improvements in ice cutting machines in which rotary knives are operated, and the vehicle carrying the operating mechanism of the knives is driven by power; and the objects of my improvements are, to provide an ice cutting machine that will afford facilities for raising and lowering the rotary knives or saws to suit the thickness of the ice to be cut; for the use of one or more of said saws; to provide a machine that will travel at a great speed while in operation; that will be easily operated and controlled; that will be simple, durable, and economical in its construction, operation and producing capacity.

I attain these objects by the mechanism illustrated in the accompanying drawings, in which similar reference numerals indicate like parts in the various figures.

Figure —1— is a front elevation of my machine in operation, the dotted lines showing the position of the saws when not in operation, and when the lever —13— is raised; Fig. —2— is a plan view of the same; and Fig. —3—, is a front view.

The operating mechanism of the ice machine is mounted upon a sled comprising the platform —1—, runners —2— and legs —3—. An engine —4— is mounted on the platform —1—, a connecting rod —5— operating the crank shaft —7— and the two fly wheels —6—. A belt —8— passing around the big pulley —9— on the shaft —7— and the small pulley —10— on the saw shaft —12— drives the saws —11— on the shaft —12—. The saw shaft —12— is mounted in bearings —12'— which are secured to the ends of the levers —13—. The upper ends of the levers —13— are connected by a suitable rod —31— and the levers are held in a desired position by means of the hooks and chains —13'— which connect the upper ends of the levers with the rear end of the platform —1—.

Beneath the platform —1— of the sled is suitably mounted a lever —16— in brackets —16'— and is provided with a handle —17—. This lever is connected at the forward end and midway of its length with inverted U-shaped levers —14— consisting of horizontal bars with two depending arms at their extremities. The upper end of each U-shaped lever is in contact with the platform in order to force the traction wheels into contact with the ice, the lower ends of the inverted U-shaped levers passing around the axles —15— and —15— which are mounted to slide vertically in the bearings —15'— which are secured to the top of the runners —2—.

Spiked wheels —18— and —18'— are mounted on the front and rear axles —15— respectively and when the lever —16— is drawn backward, the inverted U-shaped levers —14— are drawn toward a vertical position which forces the axles —15— 15— upon which the spiked wheels —18— and —18'— are mounted, downwardly in the bearings —15'— so as to cause the spiked wheels to engage the ice —26—.

Sprocket chains —20— and —20'— connect respectively sprocket wheels on the axle —22— and on the axles —15—. The axle —22— is supported in bearings —22'— secured to the lower portion of the platform —1—. The sprocket wheel —23— on the axle —22— is driven by sprocket chain —24— which connects it with the sprocket wheel —25— on the crank shaft —7—.

The top surface of the ice is indicated by the numerals —26—, the cut portion by —26'—, the ice shown in cross section is indicated by —26''—.

The water is indicated by numerals —27—. The main lever —13— is fulcrumed on the axle —28— which is mounted in bearings —29— on the forward end of the platform —1—.

Markers —30— are adapted to be hung in and carried by the sockets —30'— which are secured to the legs —3— of the sled.

I propose to use a water jacket gasolene engine to operate the saws and propel the machine. The saws can be set to cut the ice into cakes of any desired size.

It is obvious that my machine may be regulated as to speed and will cut more ice than a dozen horses. By regulating the speed of the machine, it may be made to travel from fifty to one hundred feet per minute.

With this description of the novel construction, arrangement and combination of parts of my invention, as illustrated in the accompanying drawing, what I claim as new, and desire to secure by Letters Patent, is:—

1. In an ice-cutting machine, the combination with a sled, of a pair of parallel main levers fulcrumed on the forward end of sled, a shaft mounted in the outer end of said levers, a pulley and circular saws secured to said shaft, an engine mounted on said sled, a pulley on crank-shaft of said engine and a belt connecting said pulley with pulley on saw-shaft, means for holding said levers in the tilted position desired, bearings on runners of sled, axles mounted and movable vertically in said bearings, spiked wheels mounted on said front and rear axles, a hand lever mounted in brackets beneath the platform of sled, inverted U-shaped levers pivotally connected with said hand lever at its forward end and midway of its length, the lower ends of the inverted U-shaped levers passing around said front and rear axles, sprocket wheels mounted on said front and rear axles, axle bearings suspended in a plane above said front and rear axles and beneath the sled platform, an axle mounted in said bearings, sprocket wheels secured to said axle, sprocket chains connecting sprocket wheels on said axle and on said front and rear axles to drive said spiked wheels, a sprocket on the crank-shaft of said engine and a sprocket chain connecting the sprocket on said crank-shaft with a sprocket on the axle suspended beneath the said platform, all constructed substantially as set forth.

2. In an ice-cutting machine, the combination with a sled, of a pair of parallel main levers fulcrumed on the forward end of sled, a shaft mounted in the outer end of said levers, a pulley and circular saws secured to said shaft, an engine mounted on said sled, a pulley on crank-shaft of said engine and a belt connecting said pulley with pulley on saw-shaft, means for holding said levers in the tilted position desired, bearings on runners of sled, axles mounted and movable vertically in said bearings, spiked wheels mounted on said front and rear axles, a hand lever mounted in brackets beneath the platform of sled, inverted U-shaped levers pivotally connected with said hand lever at its forward end and midway of its length, the lower ends of the inverted U-shaped levers passing around said front and rear axles, sprocket wheels mounted on said front and rear axles, axle bearings suspended in a plane above said front and rear axles and beneath the sled platform, an axle mounted in said bearings, sprocket wheels secured to said axle, sprocket chains connecting sprocket wheels on said axle and on said front and rear axles to drive said spiked wheels, a sprocket on the crank-shaft of said engine and a sprocket chain connecting the sprocket on said crank-shaft with a sprocket on the axle suspended beneath the said platform, sockets secured to the legs of said sled and markers adapted to be hung in and carried by said sockets, substantially as set forth.

In testimony whereof I affix my signature in presence of two witnesses.

JOHN J. TOBIN.

Witnesses:
WILLIAM JOHN TOBIN,
JOHN MULLALY.